United States Patent [19]
Ota

[11] Patent Number: 5,407,741
[45] Date of Patent: Apr. 18, 1995

[54] EXOTHERMIC CONDUCTIVE COATING AND HEATING DEVICE INCORPORATING SAME

[75] Inventor: Takashi Ota, 3-33, Nakasu 1-chome, Takarazuka, Hyogo 665, Japan

[73] Assignee: Takashi Ota, Hyogo, Japan

[21] Appl. No.: 13,177

[22] Filed: Jan. 29, 1993

Related U.S. Application Data

[63] Continuation of Ser. No. 663,086, Feb. 28, 1991, abandoned, which is a continuation of Ser. No. 192,143, May 10, 1988, abandoned.

[30] Foreign Application Priority Data

Oct. 21, 1987 [JP] Japan ................................. 62-263954
Oct. 21, 1987 [JP] Japan ................................. 62-263955

[51] Int. Cl.$^6$ ............................................. B32B 5/16
[52] U.S. Cl. .................................... 428/323; 428/407; 428/408; 524/496; 524/847; 523/223; 252/511
[58] Field of Search ................ 428/407, 408, 323; 523/223; 524/496, 847; 423/445, 447; 252/511

[56] References Cited

U.S. PATENT DOCUMENTS

| | | | |
|---|---|---|---|
| 3,393,085 | 7/1968 | Howard | 428/408 |
| 4,273,675 | 6/1981 | Shiiki | 423/449 |
| 4,273,682 | 6/1981 | Kanamori | 252/511 |
| 4,303,735 | 12/1981 | Kehrer et al. | 428/367 |
| 4,526,834 | 7/1985 | Mercuri et al. | 428/323 |
| 4,611,588 | 9/1986 | Laplewicz, Jr. et al. | 252/511 |
| 4,654,475 | 3/1987 | Jackson et al. | 252/511 |
| 4,654,511 | 3/1987 | Horsma et al. | 219/548 |
| 4,808,470 | 2/1989 | Geuskens | 428/408 |
| 4,818,607 | 4/1989 | Rickhorn | 428/323 |
| 5,053,278 | 10/1991 | Nakada et al. | 428/408 |
| 5,075,036 | 12/1991 | Parish et al. | 524/496 |
| 5,084,211 | 1/1992 | Kawaguchi et al. | 524/496 |
| 5,093,035 | 3/1992 | Dziurla et al. | 524/496 |

FOREIGN PATENT DOCUMENTS 60-59131 12/1985 Japan.

OTHER PUBLICATIONS

Brooks & Taylor—"The Formation of Graphitizing Carbons From The Liquid Phase"—Carbon, vol. 3, pp. 185–193 (1965).

*Primary Examiner*—Patrick J. Ryan
*Assistant Examiner*—J. M. Gray
*Attorney, Agent, or Firm*—Stephen F. K. Yee

[57] ABSTRACT

An exothermic conductive coating comprises carbon particles, a substantial portion being spherical particles having a diameter of not more than 500 μm, and a synthetic resin. A conductive heating unit is obtained by coating or impregnating a desirably-shaped solid or solid surface with the coating and curing it. The heating unit provides a uniform temperature distribution at any selected temperature up to about 450° C., and can be formed in various shapes.

10 Claims, 6 Drawing Sheets

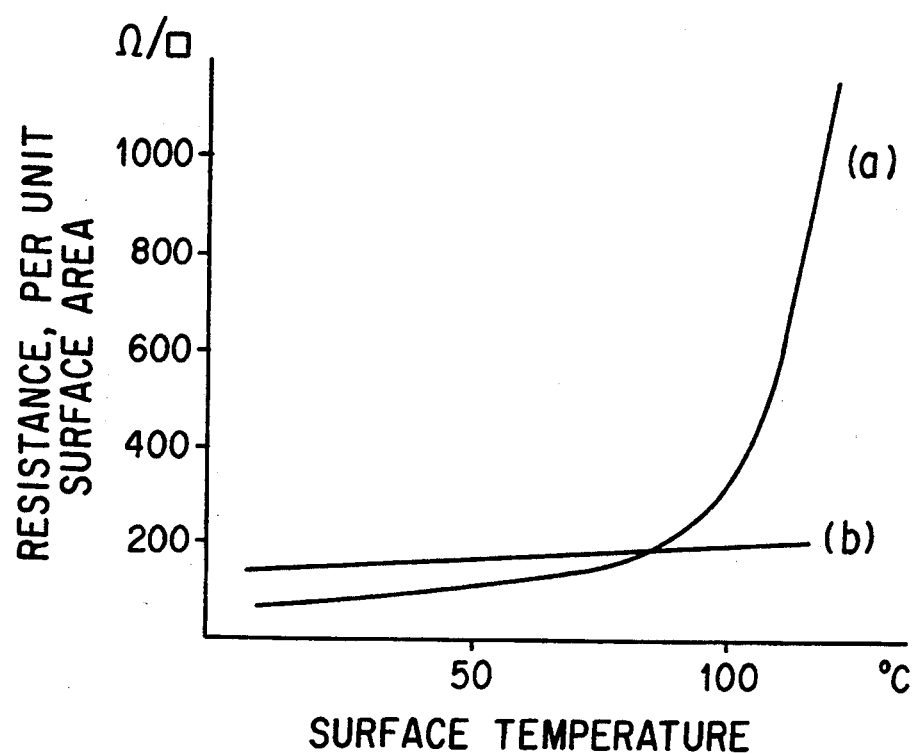
F I G. 1
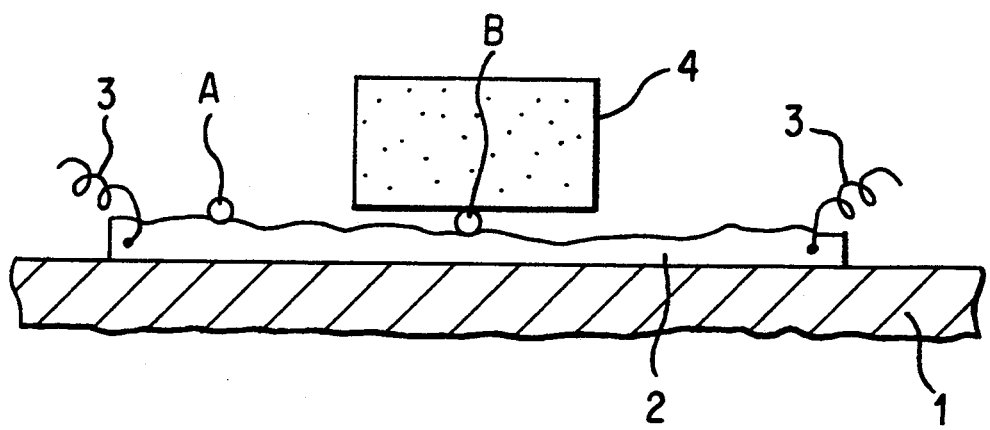
F I G. 2

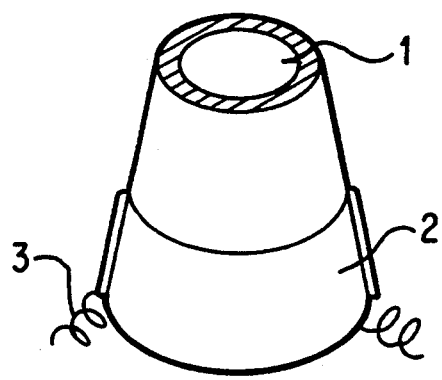
FIG. 9
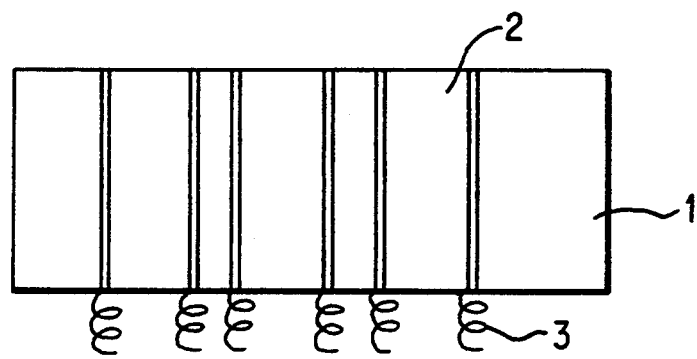
FIG. 10a
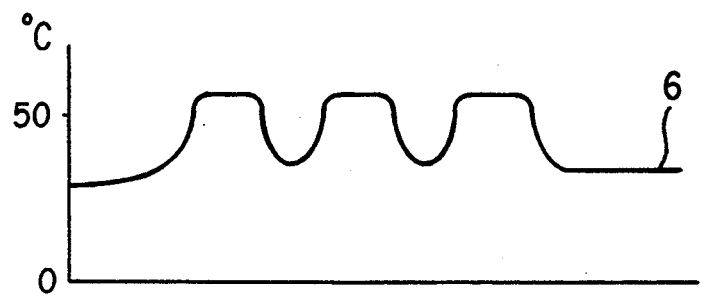
FIG. 10b
FIG. 10c

EXOTHERMIC CONDUCTIVE COATING AND HEATING DEVICE INCORPORATING SAME

This application is a continuation of application Ser. No. 07/663,086, now abandoned, filed 28, Feb. 1991, which was a continuation of application of Ser. No. 07/192,143, filed 10, May 1988, now abandoned.

BACKGROUND OF THE INVENTION (1) Technical Field

The present invention relates to an exothermic conductive coating, particularly to an exothermic conductive coating for providing a conductive heating unit which can generate a uniform temperature distribution at any temperature up to about 450° C. and the temperature of which is adjustable, and a conductive heating unit obtained therefrom.

(2) Background Information

Japanese Patent Publication No. 60-59131/1985 discloses a planar electric heating element comprising a synthetic resin film having a conductive fine powder of carbon, such as shell-like, flake-like, needle-like or fiber-like carbon, or graphite incorporated therein and electrode wires buried in the film at both ends in the longitudinal direction thereof. There is known a heating unit which comprises a solid lined with this element and the temperature of which can be increased to about 60° C.

However, for the heating unit containing the carbon black or graphite powder and the synthetic resin, the distance between electrodes on a coating film is narrow, for example, and a large heating surface having a uniform temperature distribution can not be obtained. In the heating unit wherein the conductive fine powder such as the conventional carbon or graphite powder is used, there is utilized the tape-shaped heating element which is formed by melt extrusion from the synthetic resin having this powder incorporated therein. Heretofore a paste or coating containing this conductive fine powder has not been used nor such coating applied to a surface to prepare a heating unit having a large heating surface.

When heat radiation is is blocked from the heating surface, the conventional heating unit is in danger of local oxidation or damage by burning. Therefore, the temperature of this unit can only be increased to a temperature below about 60° C.

In a conventional heating unit, a substrate 1 is lined with a planar heating element (tape) 2 as shown in FIG. 10(a). The supply of electricity through metal terminals 3 causes the heating part (element 2) to be heated to produce a temperature distribution 6 on the substrate as shown in FIG. 10(b).

Thus, for the heating unit containing the conventional conductive powder such as a shell-like, flake-like, needle-like or fiber-like carbon or graphite powder, a large heating surface having a uniform temperature distribution can not be obtained. When the substrate is coated with the paste or coating containing such an conductive powder, the thickness of the coating film must be precisely controlled. This requires that the coating be applied by a suitable machine to achieve the precise thickness, for example, of 1/10 to 1/100 mm. The coating can not be manually applied.

According to the conventional heating unit, the more electric current is supplied to the thicker portion when the thickness of the coating film is varied, and consequently the temperature of that portion is elevated. Further, the resistance slightly increases with an increase in temperature (FIG. 1(b)). Local overheating is therefore expected, when uneven action of heat radiation is exerted. In order to prevent this overheating, measures such as the use of thermostats and the incorporation of temperature controllers are taken. However, it is impossible to anticipate where heat radiation is locally prevented on the large surface. Moreover, it is impossible to estimate the number of such local portions and to mount a number of sensors thereto. Therefore, the planar electric resistance heating unit having these conventional conductive fine powders has not proven popular.

According to the prior art, the paste or coating to be precisely applied by a machine. In an electric resistance heating unit having a curved surface, an inner surface of a hole or an uneven surface on which the paste or coating can not be applied by machine, the local overheating as described above takes place. It is therefore very difficult to produce the electric resistance heating unit satisfactorily by the prior art.

Consequently, there has long been the need for an exothermic conductive coating or paste using improved conductive carbon material to provide an electric resistance heating unit with a large heating surface on which a uniform temperature distribution can be obtained, even if a substrate has a complex structure such as a curved surface, an inner surface of a hole or an uneven surface, and in which the substrate is coated with the paste or coating to a by hand or by impregnation, the local damage by melting or by burning does not take place, and the heating temperature can be freely controlled.

SUMMARY OF THE INVENTION

The present inventor has studied various exothermic conductive pastes or coatings for producing excellent heating units, particularly the type, the shape and the size of carbon powders which are most preferable in chemical resistance and sanitation as the conductive material, resins which are binders therefor, the compounding ratio thereof, and the combination of heat treating processes, coating processes and the like. As a result, it has been found that the problems described above are solved by a paste or coating comprising a synthetic resin and carbon particles, a substantial portion of such particles having a specific shape and crystalline structure, and that an excellent heating unit can be produced, thus arriving at the present invention.

In accordance with the present invention, there are provided (1) an exothermic conductive coating comprising carbon particles, mainly spherical particles having a diameter of not more than 500 μm, and a synthetic resin, (2) a conductive heating unit comprising an exothermic conductive coating film on a desirably shaped solid or solid surface having electrode terminals mounted therein, said film comprising carbon particles, mainly spherical particles having a diameter of not more than 500 μm, and a synthetic resin, (3) a conductive heating unit comprising an exothermic conductive coating film on a desirably shaped solid or solid surface having electrode terminals mounted thereon, said film comprising carbon particles, mainly spherical particles having a diameter of not more than 500 μm, and a synthetic resin, and further comprising one or more exothermic layers laminated thereon, each of which has electrode terminals and an exothermic conductive coating film, (4) a process for producing a conductive heating unit, which comprises coating or impregnating a desirably shaped solid or solid surface having electrode terminals mounted thereon with an exothermic conductive coating or paste, said coating or paste comprising carbon particles, mainly spherical particles having a diameter of not more than 500 μm, and a synthetic resin, and then curing the coating or paste to form an exothermic coating film, and (5) a process for producing a conductive heating unit, which comprises coating or impregnating a desirably shaped solid or solid surface having electrode terminals mounted thereon with an exothermic conductive coating or paste, said coating or paste comprising carbon particles, mainly spherical particles having a diameter of not more than 500 μm, and a synthetic resin, then curing the coating or paste to form an exothermic coating film, subsequently further fixing electrode terminals thereon, followed by coating or impregnating treatment with said exothermic conductive coating or paste, and curing the coating or paste to form an exothermic layer, and repeating this procedure to laminate the plural exothermic layers.

BRIEF DESCRIPTION OF THE DRAWINGS

FIG. 1 is a graph showing the relationship between the electric resistance ($\Omega/\square$) of the heating unit produced from the exothermic conductive coatings of the present invention and the prior art, and the surface temperature thereof;

FIG. 2 is a schematic view showing temperature measuring positions on the coating film;

FIG. 9 is a view illustrating the heating unit coated with the coating of the present invention;

FIGS. 10($a$), 10($b$) and 10($c$) are schematic views showing the conventional heating units;

In the Figures, designated by 1 is a substrate, designated by 2 is a coating film, designated by 3 is a terminal, designated by 4 is a heat insulating member, designated by 5 is a ceramic coating, and designated by A and B are temperature measuring points.

DESCRIPTION OF THE PREFERRED EMBODIMENTS

Carbon particles used in the present invention are necessary to contain at least 60% by weight of spherical particles. The carbon particles used in the conventional heating unit are flake-like, needle-like, fiber-like or shell-like, or most of them have these shapes. There has been no instance in which spherical carbon particles are used as an exothermic coating. From the conventional coating in which the flake-like, needle-like, fiber-like or shell-like carbon particles are used, a heating unit having a large overheating surface without local heating and with a uniform temperature distribution can not be obtained. Further, a heating unit having the temperature self-controlling property has not been obtained, because the so-called temperature coefficient of electric resistance is low (FIG. 1, curve b).

As the carbon particles used in the present invention, spherical graphite particles are preferable.

The spherical carbon particles used in the present invention contain at least 60% by weight of particles having a diameter of not more than 500 μm, practically 1 to 200 μm. If the carbon particles have a diameter of more than 500 μm, the carbon particles are heterogeneously dispersed and accordingly temperature unevenness is unfavorably apt to take place.

Figure 7:
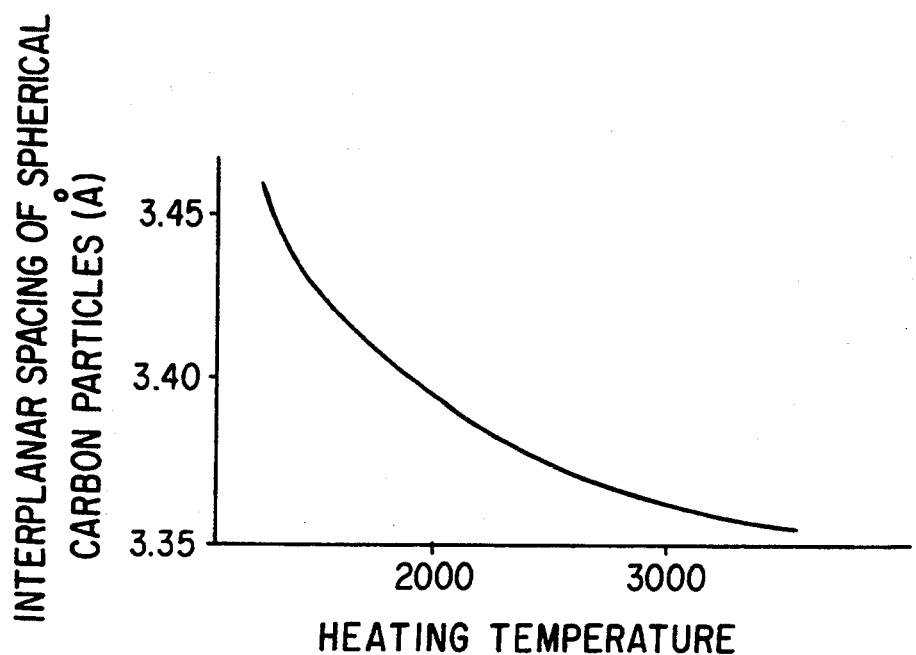
FIG. 7 is a graph showing the relationship between the temperature of heat treatment and the interplanar spacing in crystalline structure of the carbon particles.

As the spherical carbon particles used in the present invention, there are used the particles of which interplanar spacing is decreased to not more than 3.425 to 3.358 Å, preferably 3.380 to 3.358 Å, by the heat treatment at a temperature of 1500° to 3500° C. (FIG. 7). The particles having an interplanar spacing of less than 3.358 Å are more preferable, but the cost increases. If the spacing is higher than 3.425 Å, the resistance increases and Watt/cm$^2$ does not rise even if the voltage is raised (for example, up to 0.05 Watt/cm$^2$). This is therefore unfavorable, because of difficulty of elevating temperature (for example, up to 20° C.). The spherical graphite particles are preferable to be heat treated at a temperature of at least 1500° C. and have a specific resistance of not more than about 1300 to 5000 μΩ cm. The particles having a specific resistance of less than 1300 μΩcm are more preferable, but the cost increases.

The process for preparing the spherical carbon particles used in the present invention has been reported by Taylor et al. [Brooks and Taylor, Carbon 3, 185 (1965)]. There has recently been proposed the utilization of the spherical carbon particles for special carbon materials, intercalation compounds, adsorption materials, fillers and the like. However, there has been no instance in which the spherical carbon particles are used as an exothermic coating, as described above. The present inventor has found out for the first time that an excellent effect is obtained by the spherical carbon particles.

The spherical carbon particles used in the present invention may be prepared by any process, for example, by heating petroleum, coal or organic compounds to a high temperature, and carbonizing or coking them, followed by graphitization.

For example, the spherical carbon particles are also prepared, according to the process of Taylor et al., by heat treating bitumen such as coal tar, coal tar pitch, petroleum heavy gravity oil or the like, at a temperature of 350° to 500° C. for a long period of time, repeating the polycondensation reaction of the low molecular compound to polymerize, and heat treating for reduction meso carbon micro beads obtained by separating optical an isotropic spherical particles from the resulting carbonaceous material or approximately spherical coke obtained by carbonizing a synthetic resin, at a temperature of one thousand and hundreds to three thousand and hundreds for graphitization. The specific resistance is in the range of 1300 to 6000 μΩcm, and selected in accordance with the application for high resistance or low resistance.

The carbon particles used in the present invention are preferable to be heat treated at a temperature of at least 1500° C. The heat-treated carbon particles are necessary to obtain the practical electric conductivity of the coating film and the uniform dispersion of the carbon particles in a liquid coating comprising the carbon particles, a solvent and a synthetic resin or a powdery coating comprising the carbon particles and a synthetic resin.

The synthetic resin used in the present invention, which is a binder, may be a thermoplastic, a thermosetting or an electron beam curable resin, and can be suitably selected according to the application fields of the heating unit.

As the thermoplastic resin, there is used a resin having a softening point of at least 15° C. and an average molecular weight of several thousands to several hundred thousands. As the thermosetting or the reaction type resin, there is used a resin having a molecular weight of not more than 200,000 in a state of a coating liquor. This resin is heated after coating and drying, and accordingly its molecular weight approaches infinity by the reaction such as condensation or addition. Further, there can be used the electron beam curable resin,in which the radical cross-linkable or polymerisable to dryness by the radiation exposure is contained or introduced in the molecule of the thermoplastic resin. Such a radical includes an acrylic double bond contained in acrylic acid, methacrylic acid or the esters thereof, which shows radical polymerisable properties, an allylic double bond contained in diallyl phthalate or the like and an unsaturated bond contained in maleic acid, the derivatives thereof or the like.

As the synthetic resin, there can be mentioned, for example, a polyamide resin, a polyamide resin, a polyphenylene oxide resin, a silicone resin, a polytitanocarbosilane resin, a phenol resin, an epoxy resin, a polyparabanic acid resin, a polyurethane resin, a polyester resin, a polyether-etherketone resin, a polyphenylene sulfide resin, a fluorine-containing polymer, a polyolefin resin and a polyvinyl chloride resin. There can be selected a resin having a softening temperature or a decomposition temperature desired for the coating film.

The ratio of the synthetic resin to the carbon particles is variously selected depending on the desired heating temperature, the area of the heating surface, the kind of carbon particles and synthetic resin, the combination thereof and the like. However, the synthetic resin is generally used in the ratio of 25 to 220 parts by weight, preferably 30 to 200 parts by weight, to 100 parts by weight of the carbon particles.

When the ratio of the synthetic resin is less than 25 parts by weight, the electric resistance value decreases and the temperature of the heating unit can be elevated (therefore, applicable to the heating unit having a large heating surface). However, the strength of the coating film is insufficient and the temperature coefficient of electric resistance is decreased to be liable to produce temperature unevenness. On the other hand, when the ratio of the synthetic resin is more than 220 parts by weight, the electric resistance value necessary for heating can not be obtained (because of the excessive electric resistance value), which causes the coating to be unsuitable for practical use. That is to say, when the electric resistance is less than 1 Ω/□ at ordinary temperature, wherein Ω/□ represents electric resistance value per square area, the electric current excessively flows, and accordingly the temperature becomes too high and uneven. In case of more than 6,000 Ω/□, the electric current flow becomes too little, and therefore the generation of heat is so depressed that a desired temperature is difficult to be obtained.

In case of the large heating surface, the coating showing a low electric resistance such as 1 Ω/□ at ordinary temperature is used. In case of the small heating surface, the coating showing a high electric resistance such as 6,000 Ω/□ at ordinary temperature is used. In general, the coating showing an intermediate value there between is used. According to the present invention, the surface temperature of the heating unit is stably heated at a desired temperature of at most 450° C. (an environmental temperature + 30° C. to −40° C.) for a long time according to the combination of the shape of graphite, the heating temperature, the compounding of the coating, the thickness of the coating film, the applied voltage and the like.

This coating comprising the carbon powders and the synthetic resin is applied by the various coating methods such as brushing, roller coating, spray coating, electrostatic coating, electrode position coating and powder coating, or by the dipping method. To the coating, another additive or auxiliary agent may be added.

The additive or auxiliary agent includes, for example, a diluting solvent, a suspending agent or a dispersant, an antioxidant, another pigment and another necessary additive.

As the diluting solvent, there are employed the solvent usually used in the coating such as an aliphatic hydrocarbon, an aromatic petroleum naphtha, an aromatic hydrocarbon (toluene, xylene or the like), an alcohol (isopropyl alcohol, butanol, ethylhexyl alcohol or the like), an ether alcohol (ethyl cellosolve, butyl cellosolve, ethylene glycol monoether or the like), an ether (butyl ether), an acetate, an acid anhydride, an ether ester (ethyl cellosolve acetate), a ketone (methyl ethyl ketone, methyl isobutyl ketone), N-methyl-2-pyrrolidone, dimethylacetamide and tetrahydrofuran. The preferred solvent is suitably selected depending on the synthetic resin as the binder. The amount of the diluting solvent is selected in the range of 400 parts by weight or less per 100 parts by weight of the resin.

As the suspending agent, there can be mentioned methyl cellulose, calcium carbonate, modified bentonite fine powder and so on. As the dispersant, there can be used various surface-active agents such as an anionic surface-active agent (a fatty acid salt, a liquid fatty oil sulfate salt), a cationic surface-active agent (an aliphatic amine salt, a quaternary ammonium salt), an amphoteric surface-active agent and a nonionic surface-active agent. In order to achieve solidification by drying or curing of the coating or paste with ease for a short time, a curing agent may be added.

The curing agent is selected according to the resin used, and there is used the conventional curing agent such as an aliphatic or aromatic polyamine, a polyisocyanate, a polyamide, an amine or thiourea.

In addition, a stabilizer, a plasticizer, an antioxidant or the like is suitably used.

The solid made of a substrate such as a plastic material, a ceramic material, a woody material, a fibrous material, a paper material, a metal material coated with an electric insulator or the like is a desired shape or the surface thereof is coated with the present exothermic conductive coating or dipped in it to produce the heating unit.

For example, the substrate made of a metal material coated with an electric insulator, a ceramic material, a plastic material, a woody material or the combination thereof, to which at least two metal terminals are securely attached, is coated with the coating of the present invention to a thickness of about 0.2 to 3.5 mm (the thickness of the coating film after curing is 0.1 to 0.3 mm).

The shape of the plane surface or the curved surface of the substrate above described is not particularly limited. The heating unit may be produced from the linear, rod-like, cylindrical, plane or another three-dimensionally curved substrate.

Although it is desirable to coat the substrate surface with a ceramic material, a woody material is sometimes usable if a desired temperature is below 150° C. There is also usable a combined article such as a composite comprising a woody material, a plastic material or a metal material and a ceramic material applied thereon.

When the solid surface to be coated is large and there is adopted brushing, roller coating or spray coating, the fluidity of the coating is increased to improve the workability. In this case, a solvent for dilution is preferably incorporated in an amount of less than 400 parts by weight per 100 parts by weight of the conductive powder. If more solvent is incorporated, the coating is too much fluidized and it is difficult to obtain the prescribed thickness of the coating film. Therefore, the use of excessive solvent is unsuitable for obtaining a desired surface temperature of the coating film.

The coating film is cured at a temperature ranging from about 70° to 350° C. or dried to solidification, or cured by electron beams (radiation).

When the drying to solidification or the curing is conducted at a temperature ranging from 70° to 350° C. for an ample time, the smooth film having a prescribed thickness can be obtained. The solidification or the curing at a temperature higher than that is undesirable, because foaming, flowing and deterioration are liable to take place, and the solidification or the curing at a temperature lower than 70° C. is also undesirable, because it requires a lot of time.

When the coating is applied to a thickness of about 0.2 to 3.5 mm and then allowed to react for curing at a temperature of not more than 350° C., the coating film dried to solidification and having a thickness of about 0.1 to 3.0 mm is obtained. This electric resistance heating coating film generates high temperature as well as low temperature. It is preferred that the coating is applied to a thickness of about 0.1 to 3.0 mm. If the thickness is less than 0.1 mm, the electric resistance increases too high, the wattage per unit area decreases too low, and further the film strength is insufficient. When the thickness is more than 3.0 mm, segregation is liable to occur by the precipitation of particles and therefore the uniform coating film is difficult to be obtained. The electric resistance between the metal terminals on this coating film is 1 to 6000Ω/□ at ordinary temperature as described above. When the electric resistance is low, this film also becomes a conductive film.

If there is a fear of leak, the exothermic coating film is covered with an electric insulating film thinly so far as the strength is maintained. Too thick a film results in disturbance of heat transfer.

The heating unit is similarly prepared by treating a fibrous material or a paper material with the coating or paste of the present invention comprising the spherical graphite and the synthetic resin.

Also, the heating unit having excellent surface properties can be obtained by the use of the electron beam (radiation) curable resin.

According to the exothermic conductive coating of the present invention, the temperature of the heating unit is adjustable to a desired temperature, by the selection of the kind of carbon particles and synthetic resin, the compounding ratio, the thickness of the coating film and the combination thereof, and further the selection of the heating area or the applied voltage.

This is due to the selection of the spherical carbon particles in the present invention. The conventional heating unit in which the flake-like, needle-like, shell-like or fiber-like carbon or graphite is used can not possibly obtain this effect.

When the exothermic conductive coating of the present invention is used, the heating unit can be obtained by laminating the exothermic films, whereby the electric resistance is adjustable and the exothermic area can be doubled at the same temperature as described below. Further, the heating unit having the same exothermic area at the same temperature can be obtained by laminating the exothermic films to adjust the voltage.

| | Voltage | Resistance | Exothermic value | Exothermic temperature | Exothermic area |
|---|---|---|---|---|---|
| First layer | 120 V | 20Ω/□ → | 720 Watt | 220° C. | 1200 cm² |
| Second layer | 120 V | 10Ω/□ → | 1440 Watt | 220° C. | 2400 cm² |
| Third layer | 120 V | 6.66Ω/□ → | 2160 Watt | 220° C. | 3600 cm² |
| First layer | 120 V | 20Ω/□ → | 720 Watt | 220° C. | 1200 cm² |
| Second layer | 85 V | 10Ω/□ → | 720 Watt | 220° C. | 1200 cm² |
| Third layer | 69 V | 6.66Ω/□ → | 720 Watt | 220° C. | 1200 cm² |

Figures 11A, 11B:
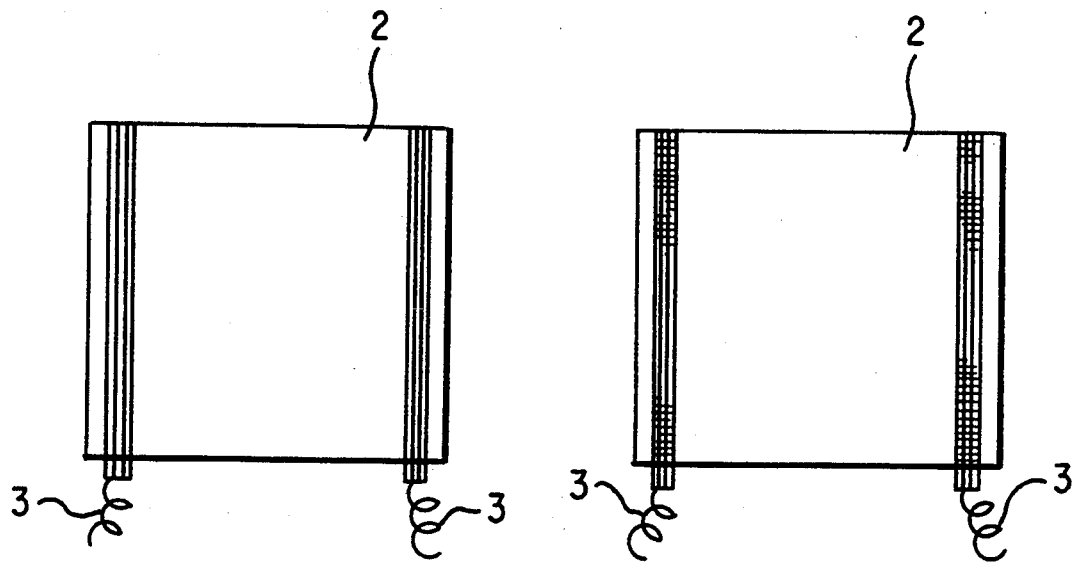
FIGS. 11($a$) and 11($b$) are views illustrating various terminals used in the heating unit.

As the electrode terminal used in the heating unit of the present invention, any type of terminal can be used. For example, the electrode terminal of metal wire or metal net can be used (FIGS. 11(a) and 11(b)). Particularly, the terminal of metal net as shown in FIG. 11(b) is preferred, which includes, for example, a copper net having an opening size of 0.3 mm×0.3 mm and composed of Ni-plated copper wires having a diameter of about 0.2 mm. This terminal of the metal net permits the heating unit having more stable exothermic temperature to be obtained.

The exothermic conductive coating has temperature self-controlling function. Thus, the thickness of the coating film need not be precisely uniform and the coating film can be manually formed on the solid surface of a desired shape. Further, the heating unit can be produced by dipping of the impregnatable solid material having a desired shape such as a fibrous material or a paper material. Therefore, the heating unit of the present invention can be widely utilized in various fields such as an interior wall application, flooring, roofing, a furnace inner surface use, pipe inner and outer surface applications, carpets, blankets, simplified heaters, warmers and antifreezers. Particularly, this heating unit is excellent as the parts for room heating, hot insulation and heating.

The exothermic conductive coating mainly comprises the spherical carbon particles and the synthetic resin. Therefore, there can be produced therefrom the heating unit which has the temperature self-controlling function, the temperature of which can be adjusted up to about 450° C., and further has a uniform temperature distribution over a large heating surface as well as a small heating surface, in various shapes and surfaces containing an uneven surface and the like. Further, the heating unit can be constituted by plural laminated layers of the coating film. Therefore, the heating unit thus obtained is suitable for wide applications, such as for an interior wall application, flooring, roofing, pipe inner and outer surface applications, a furnace inner surface use, heaters and carpets.

The present invention will now be described in detail with reference to the following examples that by no means limit the scope of the invention.

EXAMPLE 1

Using PTFE (polytetrafluoroethylene) as a synthetic resin for a binder, a coating (a) was prepared by mixing therewith 1 part by weight of spherical graphite particles of the present invention with diameters of 20 to 50 $\mu$m per 0.9 part by weight of the resin solid. On the other hand, a coating (b) was prepared by mixing 1 part by weight of the conventional needle-like graphite powder having sizes of 10 to 60 $\mu$m with the same resin solid. Each coating was used as an exothermic conductive coating.

These coatings (a) and (b) were applied on solid surfaces, respectively, to a thickness of about 0.6 mm to produce heating units.

The relationships between the electric resistance $\Omega/\square$ of these heating units and the surface temperature thereof are shown in FIG. 1.

As apparent from FIG. 1, in case of the exothermic conductive coating (a) of the present invention, an about 30-fold increase of the electric resistance was observed at 120° C. This sudden increase of a temperature coefficient of electric resistance at 100° C. shows the action of the temperature self-control.

In contrast, with respect to the coating (b) in which the conventional needle-like graphite powder is used, the electric resistance was little increased with an increase of temperature. This shows that the conventional needle-like graphite provides a very low temperature coefficient of electric resistance. Therefore, when a heat insulating member is placed on the heating unit, the electric current does not decrease and the continuous temperature increasing produces overheated spots. The flake-like, fiber-like and shell-like graphite powders also showed the same tendency as that of the needle-like graphite powder.

Figure 3:
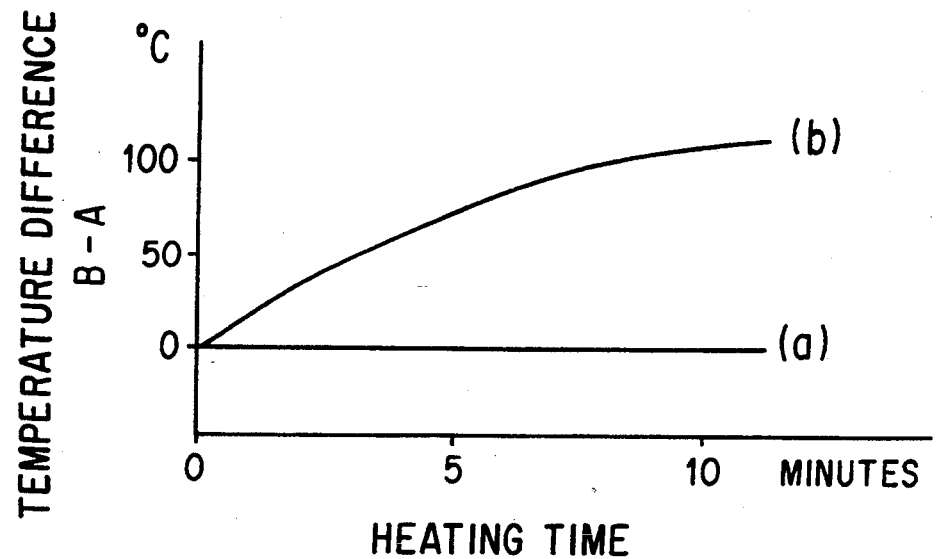
FIG. 3 is a graph showing the relationship between the time and the temperature difference, when local heat radiation of the heating units produced from the exothermic conductive coatings of the present invention and the prior art is prevented.

As shown in FIG. 2, a heat insulating member 4 (ceramic wool) was placed on the surface of the coating film 2 through which the electric current was passed to heat at 120° C., and the temperatures at the point A and the point B under the heat insulating member were measured. FIG. 3 shows the temperature differences between the temperatures at the point B and the point A of the heating units obtained from the coatings (a) and (b) according to the heating time when 0.55 Watt/cm² of electric power is fed. The heating unit obtained from the exothermic conductive coating (a) of the present invention showed only an increase of about 3° C. (123° C.−120° C.=3° C.). In contrast, the heating unit of the conventional exothermic conductive coating (b) showed an increase of about 104° C. (222° C.−118° C.=104° C.). As apparent from this, it was shown that the exothermic film of the exothermic conductive coating of the present invention had the temperature self-controlling function without the generation of overheating, even if the heat radiation was locally disturbed.

EXAMPLE 2

A heating unit having a 1.5 mm-thick coating film was obtained from a coating in which 2.2 parts by weight of PTFE solid was mixed with 1 part by weight of spherical graphite particles of which maximum diameter was 600 $\mu$m and mean diameter was 500 $\mu$m. When a voltage of 100 V was applied to this heating unit, a sudden increase of electric resistance caused no rise of temperature. When room temperature was 30° C., a temperature unevenness of 70±30° C. took place on an exothermic surface of 100 cm², and only a local rise of temperature was observed. In a similar experiment in which 2 parts by weight of PTFE solid was mixed with 1 part by weight of spherical graphite particles of which maximum diameter was 500 $\mu$m and mean diameter was 400 $\mu$m, a temperature unevenness was reduced to 75±12° C. This example showed the limits of size of the graphite particles and compounding amount of the synthetic resin for homogenizing temperature.

EXAMPLE 3

There was formed a 1 mm-thick exothermic conductive coating film in which 0.3 part by weight of PEEK (polyetheretherketone resin) solid was mixed with 1 part by weight of carbon particles containing 0.6 part by weight of spherical graphite particles with an average particle diameter of 30 $\mu$m (an interplanar spacing of 3.36±0.02 Å) and 0.4 part by weight of needle-like graphite particles with an average particle diameter of 30 $\mu$m. When 0.7 Watt/cm² of electric power was applied to this film, the electric resistance was about 210 $\Omega/\square$ even at 260° C., which was 7 times that at ordinary temperature. When heat insulating wool was locally placed on the film, the temperature thereunder rose to 290° C. In a coating film containing 0.25 part by weight of PEEK, the electric resistance became 105$\Omega/\square$ at 260° C., which was 4 times that at ordinary temperature. When heat insulating wool was locally placed on the film, the temperature thereunder rose beyond 300° C., which caused the deterioration of the film. 60% by weight of the spherical graphite particles (in the carbon particles) and 30 parts by weight of the synthetic resin (per 100 parts by weight of the carbon particles) are lower limit values at which the temperature self-controlling function acts.

EXAMPLE 4

Figure 4:
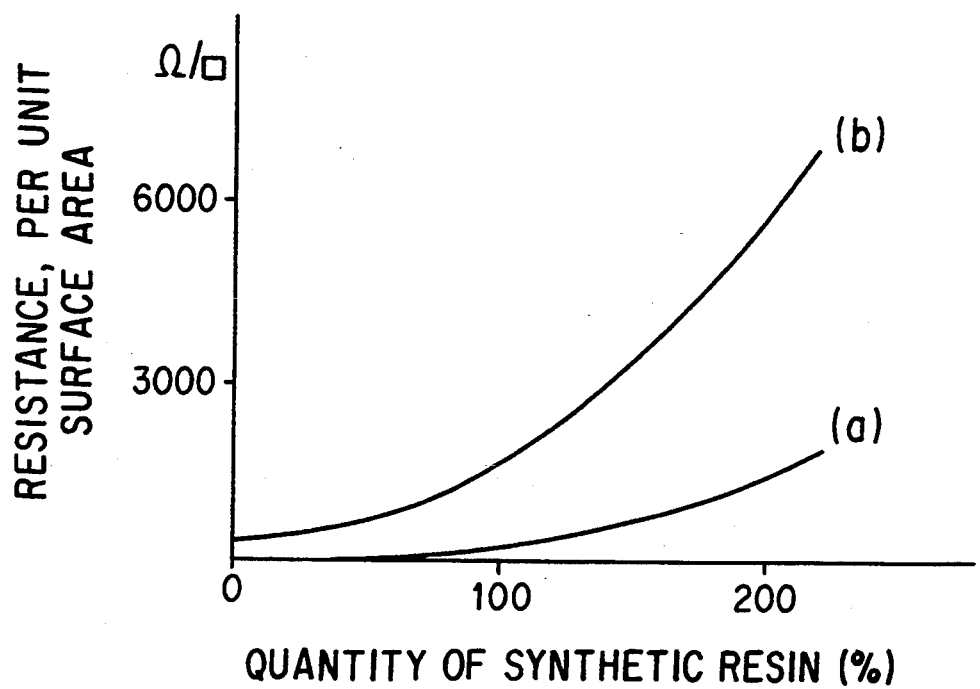
FIG. 4 is a graph showing the electric resistance relative to the size of the spherical carbon particles and the compounded amount of the synthetic resin.

Exothermic conductive films having a thickness of 0.5 mm were formed from the coatings containing 100 parts by weight of spherical graphite particles and up to 200 parts by weight of each synthetic resin of polyester, epoxy, polyamide, polyimide, polyethylene, fluorine-containing polymers, polyetheretherketone, polyphenylene sulfide, silicone and polytitanocarbosilane resins. When the electric resistance at 30° C. was measured, the resistance increased with an increase of the synthetic resin, as shown in FIG. 4. The coarse particles (100 $\mu$m) showed lower values (a), and the fine particles (1 to 8 $\mu$m) showed higher values (b). The compounding of 30 to 200% by weight of the synthetic resin provides arbitrary resistance in the range of 1 to 6000 $\Omega/\square$.

When the resistance is 6000Ω/□, the temperature of a square of the surface with each side 5 cm long can be raised to 20° C. at room temperature of 0° C., 100 V and 1.7 W (1.7 W/5×5 cm$^2$=0.07 Watt/cm$^2$). When the resistance is 3000 Ω/□, the temperature of a square of the surface with each side 7 cm long can be raised to 20° C. at 100 V and 3.3 W. Further, when the resistance is 10 Ω/□, the temperature of a square of the surface with each side 42 cm long is raised to 120° C. on applying a voltage of 100 V.

EXAMPLE 5

Figure 5:
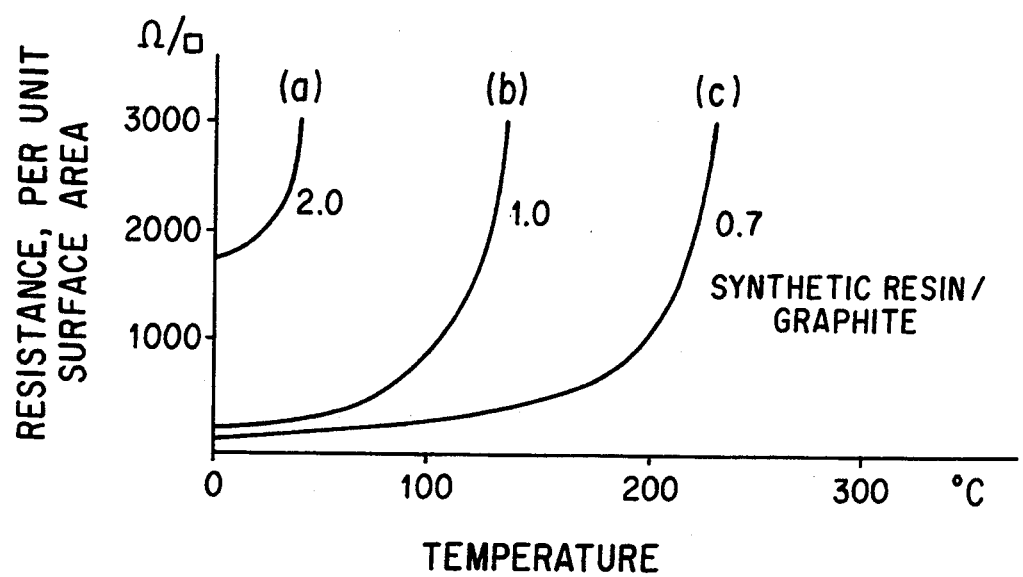
FIG. 5 is a graph showing the electric resistance and the exothermic temperature relative to the compounded amounts of the carbon particles and the synthetic resin.

Using exothermic conductive coatings containing 200 parts, 100 parts and 70 parts by weight of PTFE per 100 parts by weight of spherical graphite particles with a diameter of about 50 μm, 0.5 mm-thick coating films were formed, and the resistance and the exothermic temperature thereof were measured (FIG. 5). As apparent from FIG. 5, the higher content of the synthetic resin provides the lower exothermic temperature. When the content of PTFE is 200 parts by weight, the maximum exothermic temperature is about 30° C. at room temperature of 0° C. ((a) in FIG. 5). The exothermic temperature rises with a decrease of the synthetic resin content. When the content is 100 parts by weight, the exothermic temperature is about 120° C. ((b) in FIG. 5). Further, when the content is 70 parts by weight, the temperature can be raised to about 220° C. ((c) in FIG. 5).

When a heat-resistant polytitanocarbosilane resin is used as this synthetic resin, the high temperature up to about 450° C. can be achieved.

As described above, according to the present invention, the exothermic temperature is freely and easily adjustable up to 450° C., depending upon the diameter of the spherical carbon particles, the compounded amount of the synthetic resin and the kind of synthetic resin.

EXAMPLE 6

Figure 6:
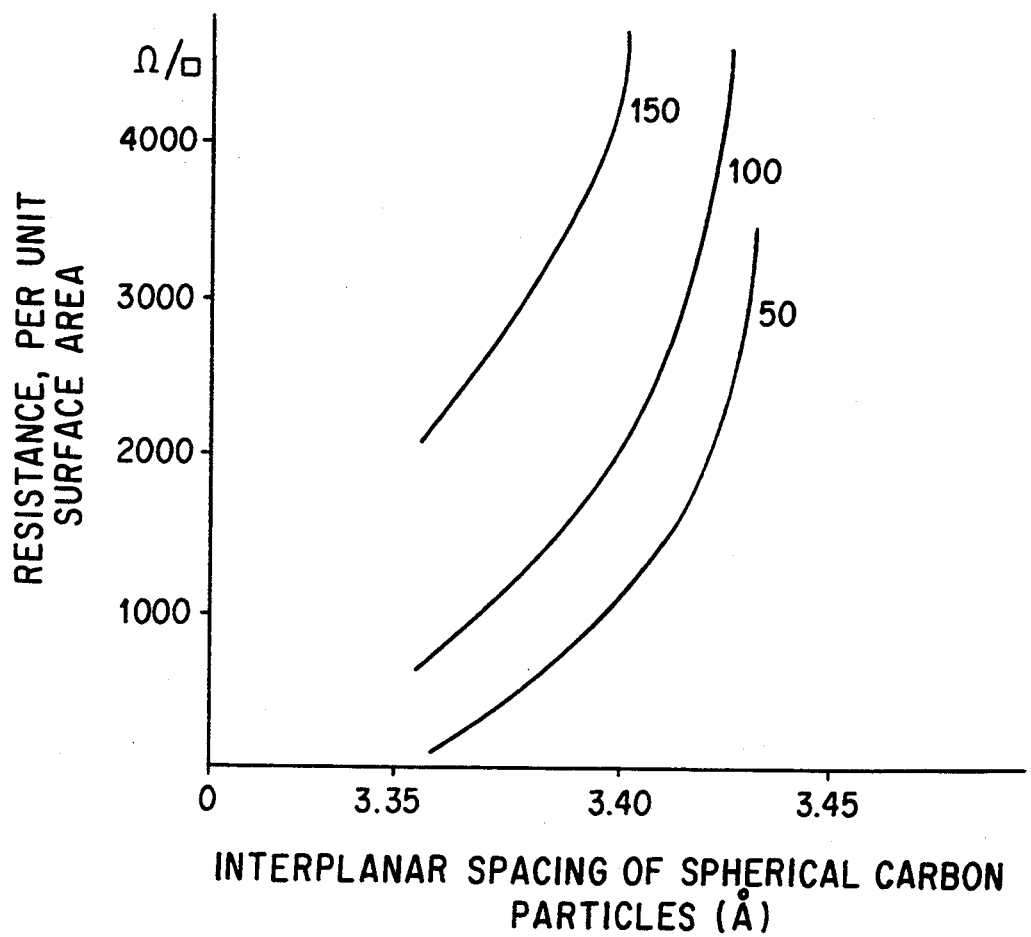
FIG. 6 is a graph showing the relationship between the interplanar spacing of the spherical carbon particles and the electric resistance.

Exothermic conductive films having a thickness of 0.5 mm were formed from the coatings containing 100 parts by weight of spherical graphite particles with a diameter of 30 μm and an interplanar spacing of 3.358 to 3.425 Å, and 50 parts, 100 parts and 150 parts by weight of each synthetic resin of polyester, epoxy, polyamide, polyimide, polyethylene, fluorine-containing polymer, polyetheretherketone, polyphenylene sulfide, silicone and polyitanosilane resins. The resistance at 30° C. was measured. The results are shown in FIG. 6. As apparent from FIG. 6, Ω/□ rapidly increased at an interplanar spacing of 3.40 to 3.425 Å, and the temperature did not rise, even if a high voltage was applied. This is therefore unsuitable for a surface heating unit.

EXAMPLE 7

Figure 8A:
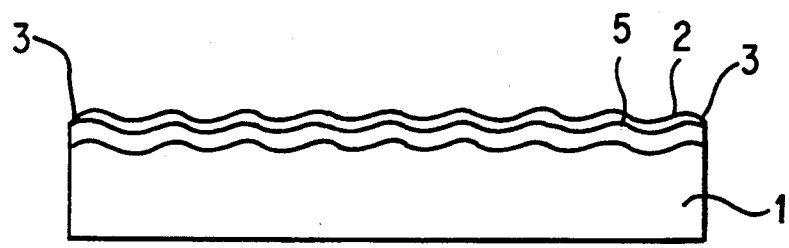
FIGS. 8($a$) and 8($b$) are graphs illustrating the heating unit coated with the coating of the present invention.
Figure 8B:
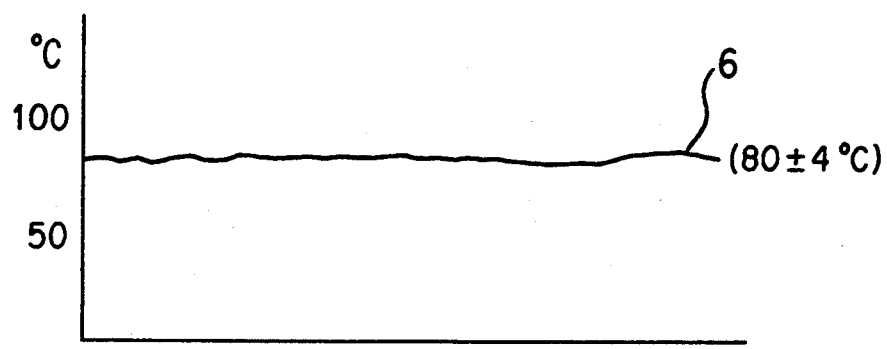

As shown in FIG. 8, a solid 1 having a corrugated uneven surface was coated with a heat-resistant ceramic material 5, to which Ni-plated copper net bands with a width of 7 mm and a net size of 0.2 mm were fixed in parallel with each other as electrode terminals 3. An exothermic conductive coating was applied thereon in which 100 parts by weight of a one-liquid type epoxy resin per 100 parts by weight of spherical graphite particles having an average diameter of 30 μm was compounded to fix a cured coating film 2 having a thickness of about 0.4 mm thereto.

When a voltage of 100 V was applied between terminals spaced 30 cm apart, an approximately uniform temperature distribution 6 of 80° C. (room temperature 30° C.+50° C.)±4° C. over the whole surface was obtained.

EXAMPLE 8

As shown in FIG. 9, metal terminals 3 were securely fixed to a frusto-conical ceramic body 1 with a wide taper, wherein the diameter of the top was 200 mm, the diameter of the base was 300 mm and the height was 500 mm. Using an exothermic conductive coating in which 0.6 parts by weight of PTFE per 1 part by weight of spherical graphite particles with an average diameter of 30 μm, there was fixed a cured coating film 2 having a thickness of 0.5 mm at the smaller diameter portion, a thickness of 0.8 mm at the larger diameter portion and an average thickness of about 0.65 mm. By applying a voltage of 120 V between the terminals, an approximately uniform temperature of 220° to 240° C. was obtained at room temperature. The use of ten Ni-plated copper wires with a diameter of 0.3 mm as the terminals caused an increase of the resistance, while continuously heated for a long time. However, the use of nets (with a net size of 0.3 mm and a net width of 7.5 mm) composed of Ni-plated copper wires with a diameter of 0.2 mm stabilized the resistance, which did not change for several thousand hours. When the same net leads of copper wires and the same exothermic film were further fixed on this exothermic film, the electric resistance was halved. Consequently, the approximately similar temperature was obtained, even if the voltage was reduced from 120 V to 85 V.

EXAMPLE 9

Band leads of nets having a net size of 0.8 mm and composed of Ni-plated copper wires with a diameter of 0.3 mm were fixed as the terminals on the both end of a square of a 30 mm-thick ceramic plate with each side 1 m long. Using an exothermic conductive coating containing 0.6 part by weight of PTFE per 1 part by weight of spherical graphite particles with an average diameter of 20 μm, a coating film having a thickness of about 0.8 mm was fixed thereon. When a voltage of 130 V was applied between the copper net terminals, a temperature of about 145° C. was obtained.

Figure 12:
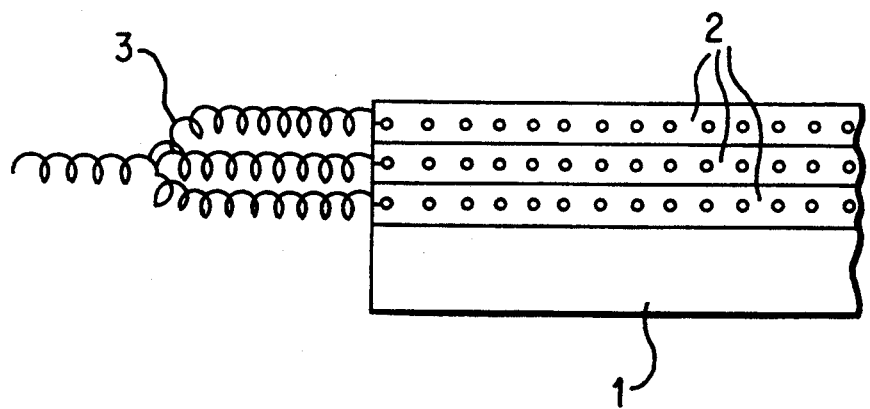
FIG. 12 is a schematic view showing the heating unit comprising coating films which are laminated.

Band leads of nets having a net size of 0.8 mm and composed of Ni-plated copper wires with a diameter of 0.3 mm were fixed as the terminals on the both ends of a square of a 30 mm- thick ceramic plate with each side 1.4 m long. Using an exothermic conductive coating containing 0.6 part by weight of PTFE per 1 part by weight of spherical graphite particles with an average diameter of 20 μm, a coating film having a thickness of about 0.8 mm was fixed thereon. When a voltage of 130 V was applied between the copper net terminals, a temperature of about 70° C. was obtained. The same leads were overlapped on that leads and fixed thereon, and the same 0.8 mm-thick film was fixed thereon by use of the same coating. The upper and lower leads were tied to one. When a voltage of 130 V was applied thereto, a temperature of about 103° C. was obtained. The lamination of three layers could provide an exothermic surface having a three-fold area at the same voltage (FIG. 12).

I claim:

1. An exothermic conductive coating for electric resistance heating which comprises graphite particles, a synthetic resin and a solvent, at least 60% by weight of said particles being spherical graphite particles having a diameter of not more than 500 μm, having been heat-treated at a temperature of at least 1500° C., and having an interplanar spacing in crystalline structure of 3.425 to 3.358 Å, said coating being exothermic upon application of an electric voltage and having uniform temperature distribution.

2. The coating as claimed in claim 1 wherein the synthetic resin is a polyester resin, an epoxy resin, a polyamide, a polyimide, polyethylene, a fluorine-containing polymer, polyetheretherketone, polyphenylene sulfide, a silicone resin or a polytitanocarbosilane resin.

3. The coating as claimed in claim 1, wherein the ratio of the synthetic resin to the graphite particle is 25 to 220 parts by weight of the synthetic resin per 100 parts by weight of the graphite particles.

4. The coating as claimed in 3, wherein me synthetic resin is a polyester resin, an epoxy resin, a polyamide, a polyimide, polyethylene, a fluorine containing polymer, polyetheretherketone, polyphenylene sulfide, a silicone resin or a polytitanocarbosilane resin.

5. An electric resistance heating unit which comprises an exothermic electrically-conductive coating film on a desirably shaped solid surface having electrode terminals mounted thereon for connection to an electric source, said film coating comprising graphite particles, a synthetic resin and a solvent, at least 60% by weight of said particles being spherical graphite particles having a diameter of not more than 500 μm, having been heat-treated at a temperature of at least 1500° C., and having an interplanar spacing in crystalline structure of 3.425 to 3.358 Å, said coating producing heat upon application of an electric voltage and self-regulating of the resulting temperature increase.

6. The heating unit as claimed in claim 5, wherein the compounding ratio of the synthetic resin to the graphite particles is 25 to 220 parts by weight of the synthetic resin per 100 parts by weight of the graphite particles.

7. The heating unit as claimed in claim 5, wherein the synthetic resin is a polyester resin, an epoxy resin, a polyamide, a polyimide, polyethylene, a fluorine-containing polymer, polyetheretherketone, polyphenylene sulfide, a silicone resin or a polytitanocarbosilane resin.

8. An electric resistance heating unit which comprises two or more exothermic layers laminated onto a desirably shaped solid surface, each of said layers formed of an electrically-conductive coating film which is exothermic upon application of an electric voltage and having electrode terminals mounted thereon for connection to an electric source, said film comprising graphite particles, a synthetic resin and a solvent, at least 60% by weight of said particles being spherical graphite particles having a diameter of not more than 500 μm, having been heat-treated at a temperature of at least 1500° C., and having an interplanar spacing in crystalline structure of 3.425 to 3.358 Å, each of said layers producing heat upon application of an electric voltage and self-regulating of the resulting temperature increase.

9. The heating unit as claimed in claim 8, wherein the compounding ratio of the synthetic resin to the graphite particles is 25 to 220 parts by weight of the synthetic resin per 100 parts by weight of the graphite particles.

10. The heating unit as claimed in claim 8, wherein the synthetic resin is a polyester resin, an epoxy resin, a polyamide, a polyimide, polyethylene, a fluorine containing polymer, polyetheretherketone, polyphenylene sulfide, a silicone resin or a polytitanocarbosilane resin.

* * * * *